United States Patent
Lin et al.

(10) Patent No.: US 12,152,721 B2
(45) Date of Patent: Nov. 26, 2024

(54) QUICK RELEASE AND ASSEMBLY CONNECTING MEMBER AND SHOOTING DEVICE

(71) Applicant: SHENZHEN LEQI NETWORK TECHNOLOGY CO., LTD., Shenzhen (CN)

(72) Inventors: Qiang Lin, Shenzhen (CN); Weiwen Xiong, Shenzhen (CN)

(73) Assignee: SHENZHEN LEQI NETWORK TECHNOLOGY CO., LTD., Shenzhen (CN)

( * ) Notice: Subject to any disclaimer, the term of this patent is extended or adjusted under 35 U.S.C. 154(b) by 197 days.

(21) Appl. No.: 17/896,108

(22) Filed: Aug. 26, 2022

(65) Prior Publication Data
US 2022/0412501 A1 Dec. 29, 2022

Related U.S. Application Data

(63) Continuation of application No. PCT/CN2021/078207, filed on Feb. 26, 2021.

(30) Foreign Application Priority Data

Feb. 28, 2020 (CN) .......................... 202020225541.5

(51) Int. Cl.
*F16M 11/04* (2006.01)
*F16B 2/06* (2006.01)
(Continued)

(52) U.S. Cl.
CPC ............. *F16M 11/041* (2013.01); *F16B 2/06* (2013.01); *F16B 2/18* (2013.01); *G03B 17/561* (2013.01)

(58) Field of Classification Search
None
See application file for complete search history.

(56) References Cited

U.S. PATENT DOCUMENTS 1,846,382 A * 2/1932 Bing .................... F16M 11/041
                                          279/71
5,337,100 A    8/1994 Oxford
(Continued)

FOREIGN PATENT DOCUMENTS

CN       102189398 A     9/2011
CN       202516220 U    11/2012
(Continued)

OTHER PUBLICATIONS

International Search Report issued in corresponding International application No. PCT/CN2021/078207, mailed May 17, 2021.
(Continued)

*Primary Examiner* — Rodney E Fuller

(57) ABSTRACT

A quick release and assembly connecting member and a shooting device are provided. The quick release and assembly connecting member includes a connecting cover, a mounting seat, and a fixing mechanism. The connecting cover includes an inserting portion. The mounting seat includes a mounting and locking mechanism. The fixing mechanism is arranged on the connecting cover and/or the mounting seat, and configured for mounting and fixing the quick release and assembly connecting member with a device. The mounting and locking mechanism includes a clamping and locking sleeve and a locking member. The clamping and locking sleeve is configured to enclose a mounting space for mounting the inserting portion, and the locking member is capable of switching between a first position and a second position, so that when the inserting portion is mounted in the mounting space, the locking (Continued)

member is capable of locking or unlocking the inserting portion.

16 Claims, 6 Drawing Sheets

(51) Int. Cl.
*F16B 2/18* (2006.01)
*G03B 17/56* (2021.01)

(56) References Cited

U.S. PATENT DOCUMENTS

2018/0299061 A1* 10/2018 Neundorf ............. F16M 11/041
2020/0240574 A1* 7/2020 Liu .................... F16M 11/2064

FOREIGN PATENT DOCUMENTS

| | | | |
|---|---|---|---|
| CN | 208149516 U | 11/2018 | |
| CN | 211089755 U | 7/2020 | |
| DE | 102016004087 A1 * | 8/2017 | .......... B25J 15/0433 |

OTHER PUBLICATIONS

Written Opinion of the International Searching Authority for No. PCT/CN2021/078207.

* cited by examiner

QUICK RELEASE AND ASSEMBLY CONNECTING MEMBER AND SHOOTING DEVICE

FIELD

The present disclosure relates to the technical field of assemble and disassembly connecting members, specifically to a quick release and assembly connecting member and a shooting device.

BACKGROUND

Shooting device, such as camcorder and camera, commonly needs to be fixed to other device or needs to be fitted with some related accessories during use. In order to assemble and disassemble the shooting device with a fixing device, close nipples are commonly used as the assembling and disassembling mechanisms. However, the assembly and disassembly are complex by using of the close nipple, so that it is hardly to realize a quickly assembling or disassembling of the shooting device. In addition, the close nipple need to be matched with an extra anti slewing mechanism to prevent the close nipple from loosening, which makes the base of quick release get complexity.

To sum up, in the related art, the assembling and disassembling mechanisms of the shooting device is complicated in structure and cannot be quickly disassembled and assembled in one step.

SUMMARY

In view of this, the present disclosure provides a quick release and assembly connecting member and a shooting device, to solve the problems that the assembling and disassembling connecting member of the shooting device has complex structures and is unable to quickly assemble and disassemble in one step.

The quick release and assembly connecting member provided by the present disclosure includes a connecting cover, a mounting seat, and a fixing mechanism;
the connecting cover includes an inserting portion;
the mounting seat includes a mounting and locking mechanism configured for clamping and locking the inserting portion; and
the fixing mechanism is arranged on the connecting cover and/or the mounting seat, and configured for mounting and fixing the quick release and assembly connecting member with a device to be connected;
the mounting and locking mechanism includes a clamping and locking sleeve and a locking member configured for adjusting a locking degree of the clamping and locking sleeve;
the clamping and locking sleeve is configured to enclose a mounting space for mounting the inserting portion; and
the locking member is capable of switching between a first position and a second position, so that when the inserting portion is mounted in the mounting space, the locking member is capable of locking or unlocking the inserting portion.

In some embodiments, the locking member includes a toggle wrench;
the toggle wrench is mounted on the mounting seat by a rotating shaft, and the toggle wrench includes a moving end capable of being toggled and a pressing end configured for abutting against the clamping and locking sleeve;
when the moving end is toggled, the toggle wrench is capable of moving around the rotating shaft, causing the toggle wrench to switch between the first position and the second position;
when the toggle wrench is in the first position, the pressing end presses the clamping and locking sleeve; and
when the toggle wrench is in the second position, the pressing end no longer presses the clamping and locking sleeve.

In some embodiments, the clamping and locking sleeve includes a C-shaped clamping sleeve;
the C-shaped clamping sleeve includes a fixing end integrally connected with the mounting seat and an abutting end abutted against the toggle wrench;
the abutting end is capable of moving towards the fixing end under a pressing of the toggle wrench, causing the C-shaped clamping sleeve to constrain and lock the inserting portion.

In some embodiments, the C-shaped clamping sleeve is an elastic clamping sleeve;
the C-shaped clamping sleeve further includes a connecting screw configured for movably connecting the abutting end with the fixing end;
when the toggle wrench skips of compressing the abutting end, the C-shaped clamping sleeve expands to unlock the inserting portion under an elastic force of the C-shaped clamping sleeve.

In some embodiments, an abutting side of the abutting end abutted against the toggle wrench further is arranged with an anti-wear washer;
the pressing end is indirectly abutted against the abutting end by the anti-wear washer; and/or
the toggle wrench is defined as an arc shape, and when the toggle wrench is in the first position, the toggle wrench abuts against an outer peripheral wall of the C-shaped clamping sleeve; and/or
an outer peripheral wall of the C-shaped clamping sleeve includes an abutting portion configured for abutting against the toggle wrench;
when the toggle wrench is in the first position, the toggle wrench is abutted against the abutting portion.

In some embodiments, an outer peripheral wall of the inserting portion is provided with an anti-off locking head;
an inner peripheral wall of the clamping and locking sleeve further defines an arc-shaped locking groove;
when the inserting portion is inserted in the clamping and locking sleeve, the anti-off locking head is correspondingly received in the arc-shaped locking groove, and the anti-off locking head is capable of moving along the arc-shaped locking groove along with a rotation of the inserting portion, for self-locking the inserting portion in the clamping and locking sleeve and preventing the inserting portion from escaping from the clamping and locking sleeve.

In some embodiments, the fixing mechanism includes a connecting portion arranged on the connecting cover and a mounting portion arranged on the mounting seat;
the connecting portion is configured for connecting and fixing the connecting cover with the device to be connected;
the mounting portion is configured for mounting and fixing the mounting seat with a fixing device.

In some embodiments, the connecting portion includes a screw rod arranged on a side of the connecting cover, and the connecting cover is screwed and fixed with the device to be connected by the screw rod;

the mounting portion includes a screw hole defined in a side of the mounting seat, and the mounting seat is screwed and fixed to the fixing device by way of the screw hole.

In some embodiments, the mounting seat further includes a positioning table;

the positioning table is arranged in the mounting space, and the inserting portion defines a positioning hole for accommodating the positioning table;

when the inserting portion is inserted in the mounting space, the positioning table is positioned and inserted in the positioning hole; and/or a side of the connecting cover having the connecting portion is further provided with a shock absorbing washer.

In addition, the present disclosure further provides a shooting device, the shooting device includes the quick release and assembly connecting member.

The shooting device includes a matching portion for assembling with the connecting cover and/or the mounting seat, respectively.

In conjunction with the above technical solutions, the beneficial effects of the disclosure are analyzed as follows:

The quick release and assembly connecting member of the present disclosure includes a connecting cover, a mounting seat, and a mounting and locking mechanism. The connecting cover includes an inserting portion, the mounting seat includes a clamping mechanism for locking the inserting portion, and the fixing mechanism is arranged on the connecting cover and/or the mounting seat, configured to mount and fix the quick release and assembly connecting member with the device. The mounting and locking mechanism includes a clamping and locking sleeve and a locking member for adjusting a locking degree of the clamping and locking sleeve, the clamping and locking sleeve is configured to enclose a mounting space for mounting the inserting portion, the locking member is capable of switching between a first position and a second position, so that when the inserting portion is mounted in the mounting space, the locking member is capable of locking or unlocking the inserting portion.

When assembling and connecting by the quick release and assembly connecting member, the device may be optionally mounted and fixed with the connecting cover and/or the mounting seat by the fixing mechanism, and the inserting portion of the connecting cover is inserted in the mounting space enclosed by the clamping and locking sleeve, the locking member is adjusted to the first position, to lock and fix the inserting portion, further to assemble and connect the connecting cover with the mounting seat, and a mounting sequence may be set according to the needs of use. When separating and disassembling the quick release and assembly connecting member, the locking member is adjusted to the second position, to unlock and release the inserting portion, that is, the connecting cover can be separated and released from the mounting seat. Compared with the method of assembling and disassembling the shooting device by screwing in the related art, the quick release and assembly connecting member has the advantages of having a simple structure, and can be assembled or disassembled quickly in one step.

In addition, the present disclosure further provides a shooting device, the shooting device includes the above-mentioned quick release and assembly connecting member, and the shooting device includes a matching portion for assembling with the connecting cover and/or the mounting seat, respectively.

The shooting device includes the above-mentioned quick release and assembly connecting member, which can achieve all the beneficial effects of the quick release and assembly connecting member, which will not be repeated here.

Other features and advantages of the embodiments of the present disclosure will be set forth in the description which follows, and will be apparent in part from the description, or will be learned by implementing the embodiments of the present disclosure. The objectives and other advantages of the embodiments of the present disclosure will be realized and attained by the structures particularly pointed out in the description and drawings.

LABELS ILLUSTRATION FOR DRAWINGS

Figure 1:
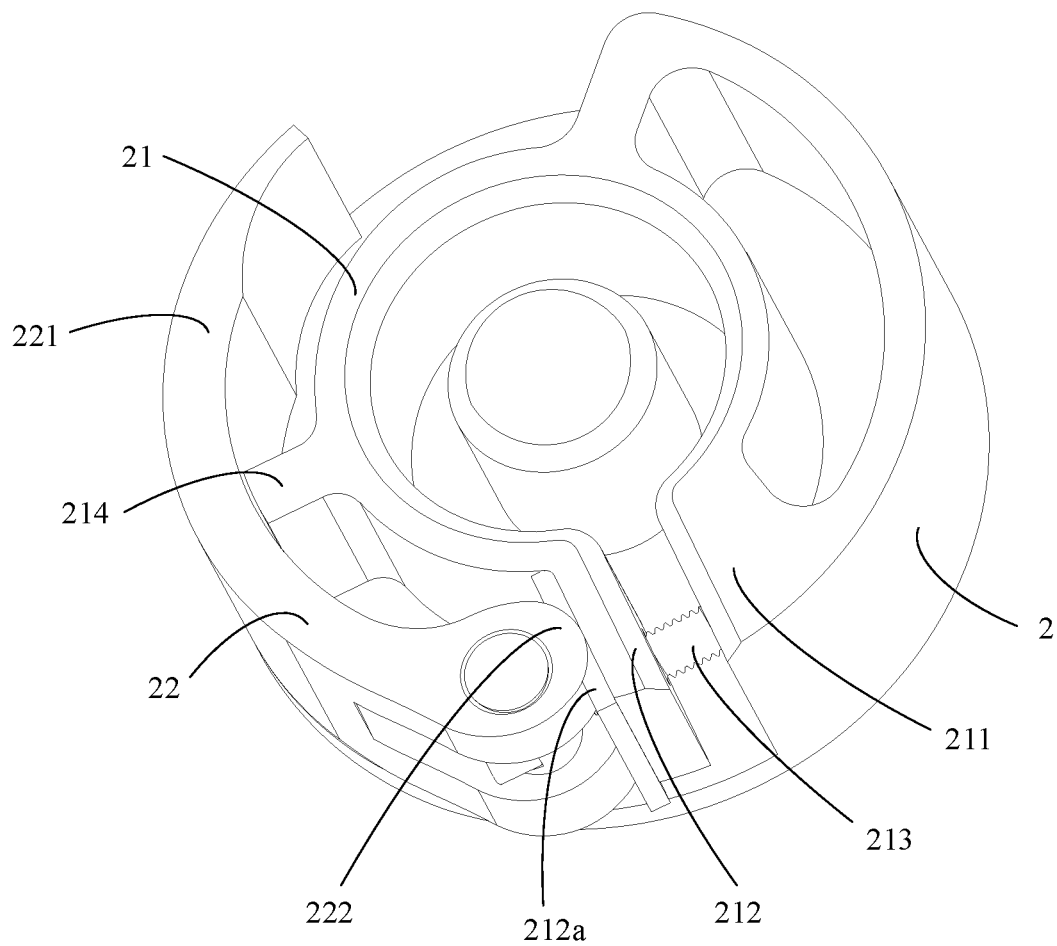
FIG. 1 is a schematic structural diagram of a mounting seat of a quick release and assembly connecting member according to an exemplary embodiment of the present disclosure, and the mounting seat is in a closed state.

1—connecting cover;
　11—inserting portion;
　　111—anti-off locking head;
　　112—positioning hole;
　12—connecting portion;
　13—shock absorbing washer;
2—mounting seat;
　21—clamping and locking sleeve;
　　211—fixing end;
　　212—abutting end;
　　212a—anti-wear washer;
　　213—connecting screw;
　　214—abutting portion;
　　215—arc-shaped locking groove;
　22—locking member;
　　221—moving end;
　　222—pressing end;
　23—mounting portion;
　24—positioning table.

The accompanying drawings are incorporated in the specification and constitute as a part of the specification, the accompanying drawings illustrate some embodiments according to the present disclosure and are used to explain the principles of the present disclosure with the specification.

DETAILED DESCRIPTION

In order to better understand the technical solutions of the present disclosure, the exemplary embodiments of the present disclosure will be described in detail in the following with reference to the accompanying drawings.

It is obvious that the embodiments to be described are only a part rather than all of the embodiments of the present disclosure. All other embodiments obtained by persons skilled in the art based on the embodiments of the present disclosure without creative efforts shall fall within the protection scope of the present disclosure.

The terms described in the present disclosure are only for description of specific embodiment, rather than limiting the scope of the disclosure. As described in the specification and claims of the present disclosure, "a", "the" and "this" are used to describe subject including the plural form, unless other situation is clearly defined in the context.

It should be understood that, the term "and/or" in the present disclosure is only used to describe an association relationship of the associated objects, and means including three paratactic solutions, for example, the "A and/or B" includes A solution, B solution, or solution of A and B. In addition, the character "/" in the present disclosure generally indicates that there is an "or" relationship between associated objects.

It is to be noted that, all of the directional instructions such as "top", "down", "left", "right" described in the exemplary embodiments of the present disclosure are described from the angles shown in the drawings, and should not be construed as implementing the present disclosure. Also, in this context, it should also be understood that when an member is referred to as being "on" or "under" another member, it can not only be directly connected "on" or "under" the other member, but also indirectly connected "on" or "under" another member through intervening members.

Specific embodiments of the quick release and assembly connecting member provided by the embodiments of the present disclosure will be described below.

Figure 2:
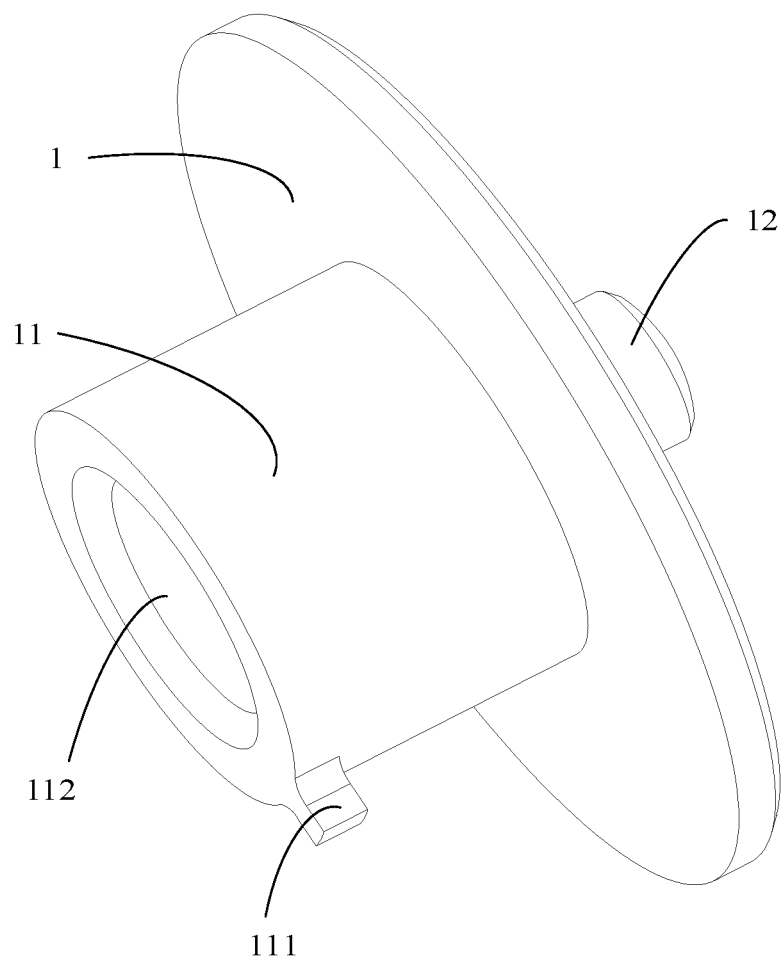
FIG. 2 is a schematic structural diagram of a connecting cover of the quick release and assembly connecting member according to an exemplary embodiment of the present disclosure.
Figure 3:
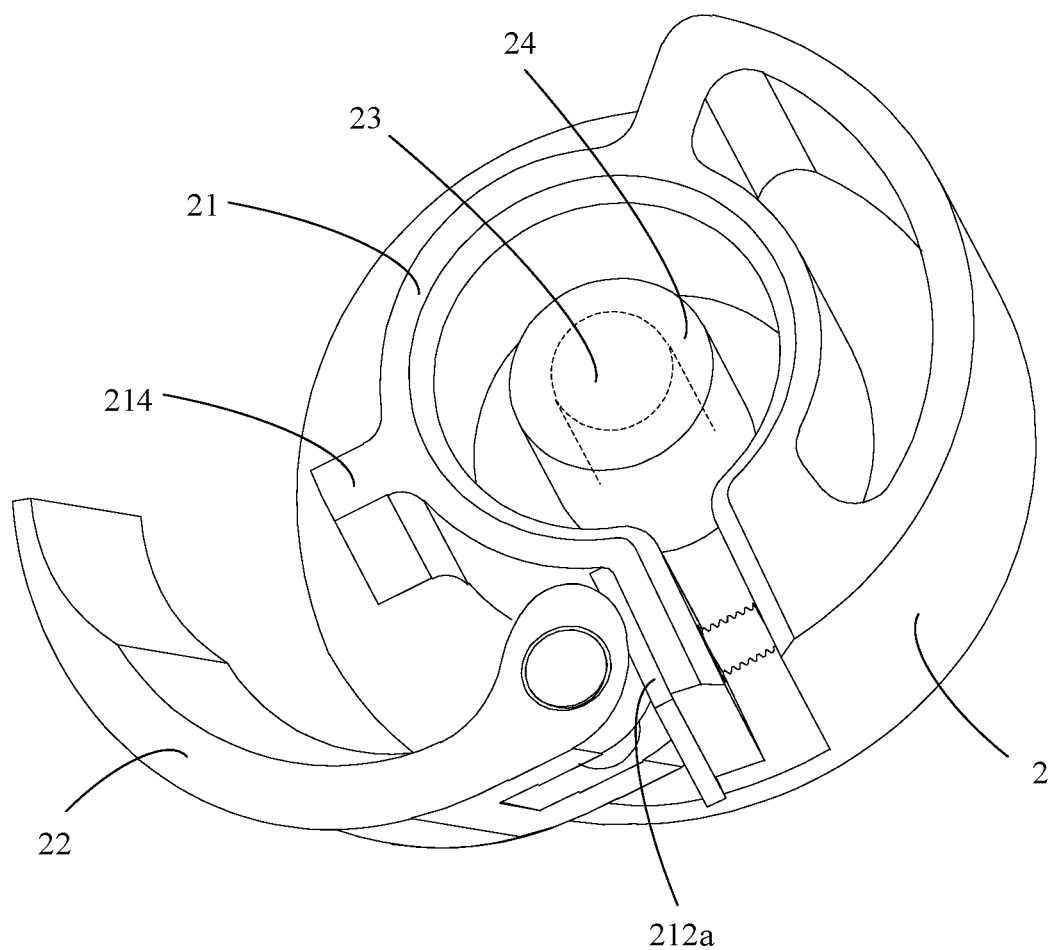
FIG. 3 is a schematic structural diagram of the mounting seat of the quick release and assembly connecting member according to an exemplary embodiment of the present disclosure, and the mounting seat is in an opened state.
Figure 4:
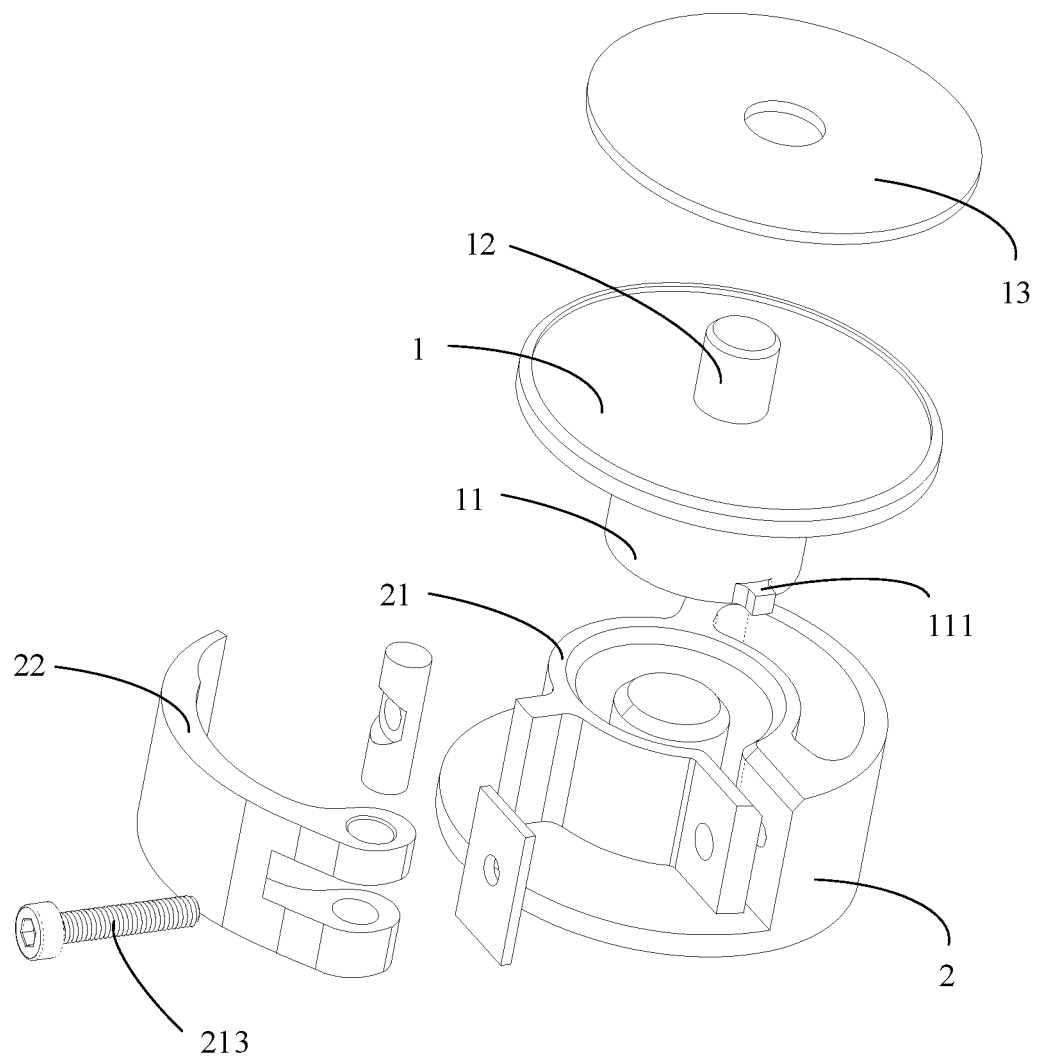
FIG. 4 is an exploded diagram of the quick release and assembly connecting member according to an exemplary embodiment of the present disclosure.
Figure 5:
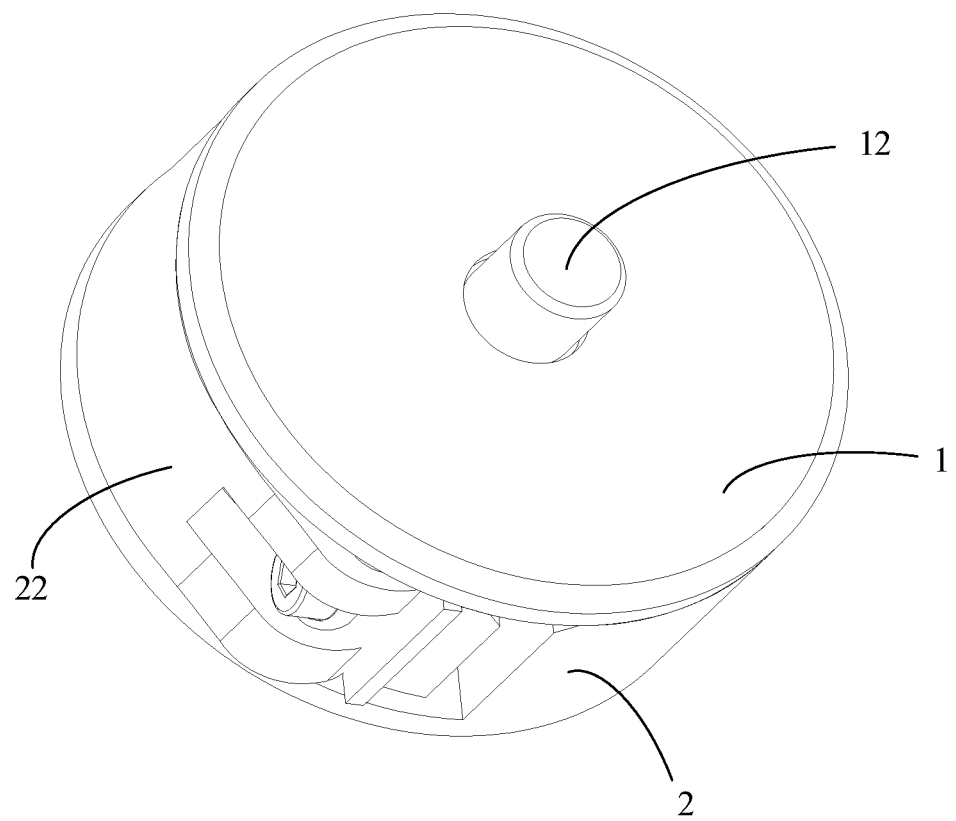
FIG. 5 is a schematic assembly diagram of the quick release and assembly connecting member according to an exemplary embodiment of the present disclosure.
Figure 6:
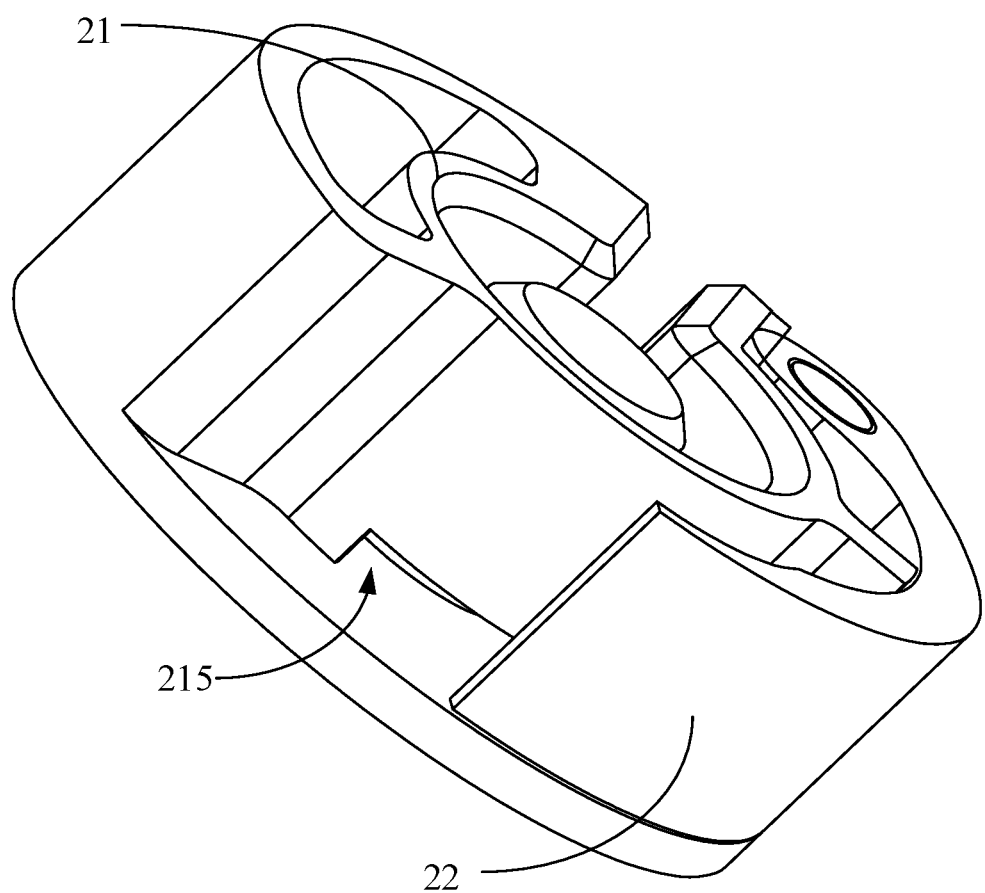
FIG. 6 is a schematic structural diagram of the mounting seat of FIG. 1 from another angle.

FIG. 1 is a schematic structural diagram of a mounting seat of the quick release and assembly connecting member according to an exemplary embodiment of the present disclosure, and the mounting seat is in a closed state. FIG. 2 is a schematic structural diagram of a connecting cover of the quick release and assembly connecting member according to an exemplary embodiment of the present disclosure. FIG. 3 is a schematic structural diagram of the mounting seat of the quick release and assembly connecting member according to an exemplary embodiment of the present disclosure, and the mounting seat is in an opened state. FIG. 4 is an exploded diagram of the quick release and assembly connecting member according to an exemplary embodiment of the present disclosure. FIG. 5 is a schematic assembly diagram of the quick release and assembly connecting member according to an exemplary embodiment of the present disclosure. FIG. 6 is similar to FIG. 1, but shown from another view.

As shown in FIGS. 1 to 6, an embodiment of the present disclosure provides a quick release and assembly connecting member. The quick release and assembly connecting member includes a connecting cover 1, a mounting seat 2 and a fixing mechanism. The connecting cover 1 includes an inserting portion 11. The mounting seat 2 includes a mounting and locking mechanism for locking the inserting portion 11, and the fixing mechanism is arranged on the connecting cover 1 and/or the mounting seat 2, for mounting and fixing the quick release and assembly connecting member with the device. The mounting and locking mechanism includes a clamping and locking sleeve 21 and a locking member 22 configured for adjusting a locking degree of the clamping and locking sleeve 21. The clamping and locking sleeve 21 is configured to enclose a mounting space for mounting the inserting portion 11. The locking member 22 is capable of switching between a first position and a second position, so that when the inserting portion 11 is mounted in the mounting space, the locking member 22 is capable of locking or unlocking the inserting portion 11.

When assembling and connecting by the quick release and assembly connecting member, the device may be optionally mounted and fixed with the connecting cover 1 and/or the mounting seat 2 by the fixing mechanism, and the inserting portion 11 of the connecting cover 1 is inserted in the mounting space enclosed by the clamping and locking sleeve 21, the locking member 22 is adjusted to the first position, to lock and fix the inserting portion 11, further to assemble and connect the connecting cover 1 with the mounting seat 2, and a mounting sequence may be set according to the needs of use. When separating and disassembling the quick release and assembly connecting member, the locking member 22 is adjusted to the second position, to unlock and release the inserting portion 11, that is, the connecting cover 1 can be separated and released from the mounting seat 2. Compared with the method of assembling and disassembling the shooting device by screwing in the related art, the quick release and assembly connecting member has the advantages of having a simple structure, and can be assembled or disassembled quickly in one step.

In an optional solution of the exemplary embodiment, the locking member 22 includes a toggle wrench, the toggle wrench is mounted on the mounting seat 2 by a rotating shaft, and the toggle wrench includes a moving end 221 capable of being toggled and a pressing end 222 configured for abutting against the clamping and locking sleeve 21. When the moving end 221 is toggled, the toggle wrench can rotate around the rotating shaft, so that the toggle wrench can be switched between the first position and the second position. When the toggle wrench is in the first position, the pressing end 222 presses the clamping and locking sleeve 21; when the toggle wrench is in the second position, the pressing end 222 no longer presses the clamping and locking sleeve 21.

Specifically, as shown in FIGS. 1 and 3, the toggle wrench is in the first position as shown in FIG. 1. At this time, the pressing end 222 of the toggle wrench presses the clamping and locking sleeve 21 tightly, so that the clamping and locking sleeve 21 can contract and lock the inserting portion 11 of the connecting cover 1, thereby connecting and fixing the connecting cover 1 with the mounting seat 2. In FIG. 3, the toggle wrench is in the second position, the pressing end 222 of the toggle wrench no longer presses the clamping and locking sleeve 21, and the clamping and locking sleeve 21 no longer contracts and locks the inserting portion 11 of the connecting cover 1, thereby unlocking and separating the connecting cover 1 from the mounting seat 2.

The locking member 22 is set as the toggle wrench, and the toggle wrench can be switched between the first position and the second position by rotating the toggle wrench around the rotating shaft, so the locking member 22 can lock and unlock the clamping and locking sleeve 21 conveniently.

In an optional solution of the exemplary embodiment, the clamping and locking sleeve 21 includes a C-shaped clamping sleeve, and the C-shaped clamping sleeve includes a fixing end 211 integrally connected with the mounting seat 2, and an abutting end 212 abutted against the toggle wrench. The abutting end 212 can move towards the fixing end 211 under a pressing of the toggle wrench, so that the C-shaped clamping sleeve is constrained to lock the inserting portion 11.

Specifically, as shown in FIG. 1, the clamping and locking sleeve 21 is set as a C-shaped clamping sleeve, an end of the C-shaped clamping sleeve is the fixing end 211 integrally connected with the mounting seat 2, and the other end of the C-shaped clamping sleeve is formed as the abutting end 212 abutted against the toggle wrench, so that the clamping and locking sleeve 21 can be constrained by toggling the toggle wrench and pressing the abutting end 212 to move towards the fixing end 211, so the locking member 22 has a simple structure and can lock and unlock the clamping and locking sleeve 21 conveniently.

In an optional solution of the exemplary embodiment, the C-shaped clamping sleeve is an elastic clamping sleeve, and the C-shaped clamping sleeve further includes a connecting screw 213 configured for movably connecting the abutting end 212 with the fixing end 211. When the toggle wrench no loner presses the abutting end 212, the C-shaped clamping sleeve expands to unlock the inserting portion 11 under an elastic force of the C-shaped clamping sleeve.

Specifically, as shown in FIG. 3, the C-shaped clamping sleeve is an elastic clamping sleeve, so that when the toggle wrench no loner presses the abutting end 212 tightly, the C-shaped clamping sleeve can automatically expand to unlock the inserting portion 11 under the elastic force of the C-shaped clamping sleeve, so the inserting portion 11 can be unlocked conveniently. The abutting end 212 is movably connected with the fixing end 211 by the connecting screw 213, to prevent the C-shaped clamping sleeve from expanding too much under the elastic force of the C-shaped clamping sleeve, so that the C-shaped clamping sleeve can be limited and fixed.

In an optional solution of the exemplary embodiment, an abutting side of the abutting end 212 abutted against the toggle wrench is further provided with an anti-wear washer 212a; the pressing end 222 is indirectly abutted against the abutting end 212 by the anti-wear washer 212a; and/or the toggle wrench is defined as an arc shape, when the toggle wrench is in the first position, the toggle wrench is abutted against an outer peripheral wall of the C-shaped clamping sleeve; or the outer peripheral wall of the C-shaped clamping sleeve is provided with an abutting portion 214 abutted against the toggle wrench, when the toggle wrench is in the first position, the toggle wrench is abutted against the abutting portion 214.

Specifically, as shown in FIG. 1, the toggle wrench is rotated around the rotating shaft and squeezes the abutting end 212 of the C-shaped clamping sleeve by the pressing end 222, to constrain the C-shaped clamping sleeve. During constraining the C-shaped clamping sleeve, a frictional force between the pressing end 222 of the toggle wrench and the abutting end 212 of the C-shaped clamping sleeve is relatively large, which is likely to cause a wear and a damage to the abutting end 212 and affect the constraining effect of the C-shaped clamping sleeve. So that, the anti-wear washer 212a is additionally arranged on the abutting side of the abutting end 212 of the C-shaped clamping sleeve abutted against the toggle wrench, to prevent the abutting end 212 from being worn and damaged.

The anti-wear washer 212a can be but not limited to a hard alloy washer, which can improve the wear resistance and simultaneously reduce the friction force between the pressing end 222 of the toggle wrench and the abutting end 212 of the C-shaped clamping sleeve, so that it is easy to rotate the toggle wrench around the rotating shaft.

The toggle wrench is set to have an arc shape that fits with the C-shaped clamping sleeve, so that when the toggle wrench rotates around the rotating shaft and switches from the first position to the second position, the arc-shaped toggle wrench can be completely fitted with the outer peripheral portion of the C-shaped clamping sleeve, so as to save space for receiving of the toggle wrench and facilitate a storage of the toggle wrench.

Moreover, the abutting portion 214 abuts against the toggle wrench and can be arranged on the outer peripheral wall of the C-shaped clamping sleeve. At this time, when the toggle wrench is in the first position, the toggle wrench is abutted against the abutting portion 214, so that a gap can be formed between the C-shaped clamping sleeve and the toggle wrench, which is convenient for the user to operate the toggle wrench to rotate.

In an optional solution of the exemplary embodiment, the outer peripheral wall of the inserting portion 11 is further arranged with an anti-off locking head 111, and an inner peripheral wall of the clamping and locking sleeve 21 further defines an arc-shaped locking groove 215, when the inserting portion 11 is inserted in the clamping and locking sleeve 21, the anti-off locking head 111 is correspondingly received in the arc-shaped locking groove 215, and the anti-off locking head 111 can rotate with the inserting portion 11 and move along the arc-shaped locking groove 215, for self-locking the inserting portion 11 in the clamping and locking sleeve 21 and preventing the inserting portion 11 from escaping from the clamping and locking sleeve 21.

Specifically, as shown in FIG. 4, an anti-off locking head 111 is arranged on the outer peripheral wall of the inserting portion 11 of the connecting cover 1, and an arc-shaped locking groove 215 is also defined in the inner peripheral wall of the clamping and locking sleeve 21. When the inserting portion 11 is inserted in the mounting space enclosed by the clamping and locking sleeve 21, the anti-off locking head 111 can be locked in the arc-shaped locking groove 215 by screwing the inserting part 11, so that the clamping and locking sleeve 21 can self-lock the inserting part 11 and prevent the inserting portion 11 from escaping from the clamping and locking sleeve 21, which can further improve the connecting firmness and safety of the quick release and assembly connecting member.

In an optional solution of the exemplary embodiment, the fixing mechanism includes a connecting portion 12 disposed on the connecting cover 1 and a mounting portion 23 disposed on the mounting seat 2. The connecting portion 12 is configured for connecting and fixing the connecting cover 1 with the device to be connected; the mounting portion 23 is configured for mounting and fixing the mounting seat 2 with a fixing device.

Specifically, as shown in FIG. 2 and FIG. 3, when the quick release and assembly connecting member is used to assemble and connect the fixing device with the device to be connected, the mounting seat 2 can be mounted and fixed with the fixing device by the mounting portion 23, and the connecting cover 1 can be connected with the device to be connected by the connecting portion 12. When the connecting cover 1 is locked with the mounting seat 2 by locking and fixing the inserting portion 11 in the clamping and locking sleeve 21, the device to be connected is connected with the fixing device quickly.

It should be noted that the above-mentioned device to be connected and the fixing device may be two components of the same device, or may be two different devices.

In an optional solution of the exemplary embodiment, the connecting portion 12 includes a screw rod arranged on a side of the connecting cover 1, and the connecting cover 1 can be screwed and fixed with the device to be connected by the screw rod; the mounting portion 23 includes a screw hole defined in a side of the mounting seat 2. The mounting seat 2 can be screwed and fixed with the fixing device by way of the screw hole.

Specifically, as shown in FIG. 2, the connecting portion 12 is a screw rod arranged on a side of the connecting cover 1, a screw hole is correspondingly arranged in the device to be connected can be connected with the connecting cover 1 by inserting the screw rod in the screw hole. The quick release and assembly connecting member has a simple structure and can mount the device conveniently.

Of course, the above-mentioned connecting portion 12 can also be set to other structures, for example, the connecting portion 12 is set as a plug-in clamping head, a plug-in clamping slot is correspondingly defined in the device to be connected, and the plug-in clamping head is detachably inserted into the plug-in clamping slot, to connect the connecting the cover 1 with the device to be connected.

Specifically, as shown in FIG. 3, the mounting portion 23 is optionally set as a screw hole defined in a bottom of the mounting seat 2, so that a screw rod is correspondingly arranged on the fixing device, the fixing device can be connected with the mounting seat 2 by screwing the screw rod in the screw hole. Of course, the mounting portion 23 can also be arranged on other positions of the mounting seat 2, such as a side surface.

Of course, the mounting portion 23 can also be set as a screw rod, and a screw hole is correspondingly defined in the fixing device, or the mounting portion 23 can be provided with the above-mentioned plug-in clamping head, and the fixing device is correspondingly provided with the plug-in clamping slot. The mounting seat 2 can also be connected with the fixing device.

In an optional solution of the exemplary embodiment, the mounting seat 2 further includes a positioning table 24, the positioning table 24 is arranged in the mounting space, and the inserting portion 11 defines a positioning hole 112 for accommodating the positioning table 24. When the inserting portion 11 is inserted in the mounting space, the positioning table 24 is positioned and inserted in the positioning hole 112; and/or a shock absorbing washer is also arranged on a side of the connecting cover 1 where the connecting portion 12 is disposed.

Specifically, as shown in FIG. 2 and FIG. 3, the positioning table 24 can be specifically arranged as a cylindrical shape as shown in FIG. 3, of course, the positioning table 24 can also be arranged in a shape of a frustum, a cone, or the like, and the positioning hole 112 is arranged to have a shape fitted with the positioning table 24. The above-mentioned positioning table 24 and positioning hole 112 can quickly mount and position the inserting portion 11 when the inserting portion 11 is inserted in the mounting space. Further, when the anti-off locking head 111 is locked in the arc-shaped locking groove 215 by screwing the inserting portion 11, the positioning table 232 can also play a certain role of supporting the inserting portion 11.

It is worth noting that, in order to facilitate a manufacture of the mounting seat 2, the above-mentioned mounting portion 23 and the positioning table 24 can be integrally formed. For example, the screw hole is defined in the side of the positioning table 24 away from the connection cover 1, the positioning table 24 can normally realize the above-mentioned positioning function, and the screw hole can realize the above-mentioned mounting function, and the two functions do not affect each other.

Of course, the mounting portion 23 and the positioning table 24 can also be arranged separately, and the mounting portion 23 can be flexibly arranged on other portions of the mounting seat 2 to adapt to different operating conditions.

Specifically, the shock absorbing washer can be a rubber washer, a silicone washer, etc., which is attached to the side where the connecting portion 12 of the connecting cover 1 is arranged. Through setting the shock absorbing washer, the mounting stability, and the shock absorbing ability of the connecting cover 1 and the device to be connected can be improved.

In addition, the present disclosure further provides a shooting device according to an embodiment, the shooting device includes the above-mentioned quick release and assembly connecting member. The shooting device includes matching portions configured for assembling with the connecting cover 1 and/or the mounting seat 2 respectively.

Specifically, the shooting device may be a camcorder, a camera, or the like. Since the shooting device includes the above-mentioned quick release and assembly connecting member, and can achieve all beneficial effects of the quick release and assembly connecting member, which will not be repeated here.

The above description is merely some embodiments. It should be noted that for one with ordinary skills in the art, improvements can be made without departing from the concept of the present disclosure, but these improvements shall fall into the protection scope of the present disclosure.

What is claimed is:

1. A quick release and assembly connecting member, comprising:
   a connecting cover, comprising an inserting portion;
   a mounting seat, comprising a mounting and locking mechanism configured for clamping and locking the inserting portion; and
   a fixing mechanism, arranged on the connecting cover and/or the mounting seat, and configured for mounting and fixing the quick release and assembly connecting member with a device to be connected;
   wherein, the mounting and locking mechanism comprises a clamping and locking sleeve and a locking member configured for adjusting a locking degree of the clamping and locking sleeve; the clamping and locking sleeve is configured to enclose a mounting space for mounting the inserting portion; and
   the locking member is capable of switching between a first position and a second position, so that when the inserting portion is mounted in the mounting space, the locking member is capable of locking or unlocking the inserting portion;
   wherein the fixing mechanism comprises a connecting portion arranged on the connecting cover and a mounting portion arranged on the mounting seat;
   wherein the connecting portion is configured for connecting and fixing the connecting cover with the device to be connected; and
   the mounting portion is configured for mounting and fixing the mounting seat with a fixing device.

2. The quick release and assembly connecting member according to claim 1, wherein the locking member comprises a toggle wrench;
the toggle wrench is mounted on the mounting seat by a rotating shaft, and the toggle wrench comprises a moving end capable of being toggled and a pressing end configured for abutting against the clamping and locking sleeve;
when the moving end is toggled, the toggle wrench is capable of moving around the rotating shaft, causing the toggle wrench to switch between the first position and the second position;
when the toggle wrench is in the first position, the pressing end presses the clamping and locking sleeve; and
when the toggle wrench is in the second position, the pressing end no longer presses the clamping and locking sleeve.

3. The quick release and assembly connecting member according to claim 2, wherein the clamping and locking sleeve comprises a C-shaped clamping sleeve;
the C-shaped clamping sleeve comprises a fixing end integrally connected with the mounting seat and an abutting end abutted against the toggle wrench;
the abutting end is capable of moving towards the fixing end under a pressing of the toggle wrench, causing the C-shaped clamping sleeve to constrain and lock the inserting portion.

4. The quick release and assembly connecting member according to claim 3, wherein the C-shaped clamping sleeve is an elastic clamping sleeve;
the C-shaped clamping sleeve further comprises a connecting screw configured for movably connecting the abutting end with the fixing end;
when the toggle wrench skips of compressing the abutting end, the C-shaped clamping sleeve expands to unlock the inserting portion under an elastic force of the C-shaped clamping sleeve.

5. The quick release and assembly connecting member according to claim 3, wherein an abutting side of the abutting end abutted against the toggle wrench is arranged with an anti-wear washer;
the pressing end is indirectly abutted against the abutting end by the anti-wear washer; and/or washer; and/or
the toggle wrench is defined as an arc shape, and when the toggle wrench is in the first position, the toggle wrench abuts against an outer peripheral wall of the C-shaped clamping sleeve; and/or
an outer peripheral wall of the C-shaped clamping sleeve comprises an abutting portion configured for abutting against the toggle wrench;
when the toggle wrench is in the first position, the toggle wrench is abutted against the abutting portion.

6. The quick release and assembly connecting member according to claim 1, wherein an outer peripheral wall of the inserting portion is provided with an anti-off locking head;
an inner peripheral wall of the clamping and locking sleeve further defines an arc-shaped locking groove;
when the inserting portion is inserted in the clamping and locking sleeve, the anti-off locking head is correspondingly received in the arc-shaped locking groove, and the anti-off locking head is capable of moving along the arc-shaped locking groove along with a rotation of the inserting portion, for self-locking the inserting portion in the clamping and locking sleeve and preventing the inserting portion from escaping from the clamping and locking sleeve.

7. The quick release and assembly connecting member according to claim 1, wherein the connecting portion comprises a screw rod arranged on a side of the connecting cover, and the connecting cover is screwed and fixed with the device to be connected by the screw rod;
the mounting portion comprises a screw hole defined in a side of the mounting seat, and the mounting seat is screwed and fixed to the fixing device by way of the screw hole.

8. The quick release and assembly connecting member according to claim 1, wherein the mounting seat further comprises a positioning table;
the positioning table is arranged in the mounting space, and the inserting portion defines a positioning hole for accommodating the positioning table;
when the inserting portion is inserted in the mounting space, the positioning table is positioned and inserted in the positioning hole; and/or
a side of the connecting cover comprising the connecting portion is further provided with a shock absorbing washer.

9. A shooting device, wherein the shooting device comprises a quick release and assembly connecting member, the quick release and assembly connecting member comprises:
a connecting cover, comprising an inserting portion;
a mounting seat, comprising a mounting and locking mechanism configured for clamping and locking the inserting portion; and
a fixing mechanism, arranged on the connecting cover and/or the mounting seat, and configured for mounting and fixing the quick release and assembly connecting member with the shooting device;
wherein, the mounting and locking mechanism comprises a clamping and locking sleeve and a locking member configured for adjusting a locking degree of the clamping and locking sleeve; the clamping and locking sleeve is configured to enclose a mounting space for mounting the inserting portion; and
the locking member is capable of switching between a first position and a second position, so that when the inserting portion is mounted in the mounting space, the locking member is capable of locking or unlocking the inserting portion;
wherein the fixing mechanism comprises a connecting portion arranged on the connecting cover and a mounting portion arranged on the mounting seat;
wherein the connecting portion is configured for connecting and fixing the connecting cover with the shooting device to be connected; and
the mounting portion is configured for mounting and fixing the mounting seat with a fixing device.

10. The shooting device according to claim 9, wherein the locking member comprises a toggle wrench;
the toggle wrench is mounted on the mounting seat by a rotating shaft, and the toggle wrench comprises a moving end capable of being toggled and a pressing end configured for abutting against the clamping and locking sleeve;
when the moving end is toggled, the toggle wrench is capable of moving around the rotating shaft, causing the toggle wrench to switch between the first position and the second position;
when the toggle wrench is in the first position, the pressing end presses the clamping and locking sleeve; and when the toggle wrench is in the second position, the pressing end no longer presses the clamping and locking sleeve.

11. The shooting device according to claim 10, wherein the clamping and locking sleeve comprises a C-shaped clamping sleeve;
   the C-shaped clamping sleeve comprises a fixing end integrally connected with the mounting seat and an abutting end abutted against the toggle wrench;
   the abutting end is capable of moving towards the fixing end under a pressing of the toggle wrench, causing the C-shaped clamping sleeve to constrain and lock the inserting portion.

12. The shooting device according to claim 11, wherein the C-shaped clamping sleeve is an elastic clamping sleeve;
   the C-shaped clamping sleeve further comprises a connecting screw configured for movably connecting the abutting end with the fixing end;
   when the toggle wrench skips of compressing the abutting end, the C-shaped clamping sleeve expands to unlock the inserting portion under an elastic force of the C-shaped clamping sleeve.

13. The shooting device according to claim 11, wherein an abutting side of the abutting end abutted against the toggle wrench is arranged with an anti-wear washer;
   the pressing end is indirectly abutted against the abutting end by the anti-wear washer; and/or
   the toggle wrench is defined as an arc shape, and when the toggle wrench is in the first position, the toggle wrench abuts against an outer peripheral wall of the C-shaped clamping sleeve; and/or
   an outer peripheral wall of the C-shaped clamping sleeve comprises an abutting portion configured for abutting against the toggle wrench;
   when the toggle wrench is in the first position, the toggle wrench is abutted against the abutting portion.

14. The shooting device according to claim 9, wherein an outer peripheral wall of the inserting portion is provided with an anti-off locking head;
   an inner peripheral wall of the clamping and locking sleeve further defines an arc-shaped locking groove;
   when the inserting portion is inserted in the clamping and locking sleeve, the anti-off locking head is correspondingly received in the arc-shaped locking groove, and the anti-off locking head is capable of moving along the arc-shaped locking groove along with a rotation of the inserting portion, for self-locking the inserting portion in the clamping and locking sleeve and preventing the inserting portion from escaping from the clamping and locking sleeve.

15. The shooting device according to claim 9, wherein the connecting portion comprises a screw rod arranged on a side of the connecting cover, and the connecting cover is screwed and fixed with the device to be connected by the screw rod;
   the mounting portion comprises a screw hole defined in a side of the mounting seat, and the mounting seat is screwed and fixed to the fixing device by way of the screw hole.

16. The shooting device according to claim 9, wherein the mounting seat further comprises a positioning table;
   the positioning table is arranged in the mounting space, and the inserting portion defines a positioning hole for accommodating the positioning table;
   when the inserting portion is inserted in the mounting space, the positioning table is positioned and inserted in the positioning hole; and/or
   a side of the connecting cover comprising the connecting portion is further provided with a shock absorbing washer.

* * * * *